United States Patent
Ward et al.

(10) Patent No.: US 8,678,157 B2
(45) Date of Patent: *Mar. 25, 2014

(54) ISOLATOR DECOUPLER

(75) Inventors: Peter Ward, Farmington Hills, MI (US);
Alexander Serkh, Troy, MI (US);
Imtiaz Ali, Lathrup Village, MI (US);
Dean Schneider, Washington, MI (US)

(73) Assignee: Gates Corporation, Denver, CO (US)

( * ) Notice: Subject to any disclaimer, the term of this patent is extended or adjusted under 35 U.S.C. 154(b) by 327 days.

This patent is subject to a terminal disclaimer.

(21) Appl. No.: 13/115,204

(22) Filed: May 25, 2011

(65) Prior Publication Data

US 2012/0298474 A1    Nov. 29, 2012

(51) Int. Cl.
*F16D 47/04* (2006.01)
*F16D 7/02* (2006.01)
*F16H 55/36* (2006.01)

(52) U.S. Cl.
USPC .......... 192/55.1; 192/41 R; 192/55.5; 464/40; 474/94

(58) Field of Classification Search
USPC ............. 192/55.5, 55.6, 55.1; 474/94; 464/40
See application file for complete search history.

(56) References Cited

U.S. PATENT DOCUMENTS

| | | | |
|---|---|---|---|
| 4,433,765 A * | 2/1984 | Rude et al. | 192/41 S |
| 4,821,390 A | 4/1989 | Seyler | |
| 5,139,463 A | 8/1992 | Bytzek et al. | |
| 5,156,573 A | 10/1992 | Bytzek et al. | |
| 6,044,943 A | 4/2000 | Bytzek et al. | |
| 6,083,130 A | 7/2000 | Mevissen et al. | |
| 7,153,227 B2 | 12/2006 | Dell et al. | |
| 7,207,910 B2 | 4/2007 | Dell et al. | |
| 7,712,592 B2 * | 5/2010 | Jansen et al. | 192/41 S |
| 2010/0116617 A1 * | 5/2010 | Serkh et al. | 192/41 S |
| 2011/0065537 A1 * | 3/2011 | Serkh et al. | 474/94 |
| 2013/0092501 A1 * | 4/2013 | Schneider et al. | 192/41 S |

FOREIGN PATENT DOCUMENTS

| | | |
|---|---|---|
| EP | 368526 A1 | 5/1990 |
| GB | 2211565 A | 7/1989 |
| WO | 03/048606 A1 | 6/2003 |

* cited by examiner

*Primary Examiner* — Richard M. Lorence
(74) *Attorney, Agent, or Firm* — Jeffrey A. Thurnau, Esq.; Paul N. Dunlap, Esq.

(57) ABSTRACT

An isolating decoupler comprising a shaft, a pulley rotationally engaged with the shaft, a coil spring engaged between the pulley and a spring carrier, the spring carrier moveable relative to the shaft and pulley, a one-way clutch mounted to the shaft, a first torsion spring and a second torsion spring engaged between the spring carrier and the one-way clutch, the first torsion spring and the second torsion spring having a releasable frictional engagement with the one-way clutch, the first torsion spring and the second torsion spring comprising adjacent parallel strands and having substantially equal diameters, the first torsion spring and the second torsion spring each being engagable with the pulley, the first torsion spring releasing a frictional engagement with the one-way clutch upon an engagement with the pulley, and the second torsion spring releasing a frictional engagement with the one-way clutch upon an engagement with the pulley.

12 Claims, 6 Drawing Sheets

ISOLATOR DECOUPLER

FIELD OF THE INVENTION

The invention relates to an isolator decoupler, and more particularly, an isolating decoupler comprising a first torsion spring and a second torsion spring engaged between a spring carrier and a one-way clutch, the first torsion spring and the second torsion spring having a frictional engagement with the one-way clutch, the first torsion spring and the second torsion spring engagable with the pulley whereby upon contact with the pulley the first torsion spring and second torsion spring will release the frictional engagement with the one-way clutch.

BACKGROUND OF THE INVENTION

Diesel engines used for passenger car applications is increasing due to the benefit of better fuel economy. Further, gasoline engines are increasing compression ratios to improve the fuel efficiency. As a result, diesel and gasoline engine accessory drive systems have to overcome the vibrations of greater magnitude from crankshafts due to above mentioned changes in engines.

Due to increased crankshaft vibration plus high acceleration/deceleration rates and high alternator inertia the engine accessory drive system is often experiencing belt chirp noise due to belt slip. This will also reduce the belt operating life.

Crankshaft isolators/decouplers and alternator decouplers/isolators have been widely used for engines with high angular vibration to filter out vibration in engine operation speed range. However, although a crankshaft isolator can function very well in engine running speed range; it still presents problems during engine start-up or shut-down due to the natural frequency of the isolator itself.

Representative of the art is U.S. Pat. No. 7,507,172 which discloses a tensioner that features a backstop device which allows free rotation of the pivot arm in one direction but not the other. Reverse rotation is prevented by friction that is able to resist torque on the pivot arm under ordinary operating conditions which otherwise could permit belt tooth-skip to occur. In disclosed embodiments, the backstop device includes a stop sleeve and a clamp holder which are axially interlocked and are able to rotate relative to each other. A clutch spring surrounds permits relative rotation between the stop sleeve and the clamp holder in one direction but not the other. A clamp retained within the clamp holder frictionally engages the pivot shaft. A viscous coupling may be used in place of the frictional clamp.

What is needed is an isolating decoupler comprising a first torsion spring and a second torsion spring engaged between a spring carrier and a one-way clutch, the first torsion spring and the second torsion spring having a frictional engagement with the one-way clutch, the first torsion spring and the second torsion spring engagable with the pulley whereby upon contact with the pulley the first torsion spring and second torsion spring will release the frictional engagement with the one-way clutch. The present invention meets this need.

SUMMARY OF THE INVENTION

The primary aspect of the invention is an isolating decoupler comprising a first torsion spring and a second torsion spring engaged between a spring carrier and a one-way clutch, the first torsion spring and the second torsion spring having a frictional engagement with the one-way clutch, the first torsion spring and the second torsion spring engagable with the pulley whereby upon contact with the pulley the first torsion spring and second torsion spring will release the frictional engagement with the one-way clutch.

Other aspects of the invention will be pointed out or made obvious by the following description of the invention and the accompanying drawings.

The invention comprises an isolating decoupler comprising a shaft, a pulley rotationally engaged with the shaft, a coil spring engaged between the pulley and a spring carrier, the spring carrier moveable relative to the shaft and pulley, a one-way clutch mounted to the shaft, a first torsion spring and a second torsion spring engaged between the spring carrier and the one-way clutch, the first torsion spring and the second torsion spring having a releasable frictional engagement with the one-way clutch, the first torsion spring and the second torsion spring comprising adjacent parallel strands and having substantially equal diameters, the first torsion spring and the second torsion spring each being engagable with the pulley, the first torsion spring releasing a frictional engagement with the one-way clutch upon an engagement with the pulley, and the second torsion spring releasing a frictional engagement with the one-way clutch upon an engagement with the pulley.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

This invention relates to alternator tuning devices, particularly to alternator isolating pulleys with torsional springs for isolation and/or one-way clutches for decoupling. To minimize the physical size of the spring and one-way clutch it is beneficial to have an overload feature that prevents torque in excess of a predetermined amount to be transmitted to the spring and/or one-way clutch. Excessive torque applied to either the spring or one-way clutch could cause either component to fail. What is needed is a slip feature that permits decoupling of two locked elements when a specific torque is exceeded.

It is known that the rated peak torque of an alternator is less than the peak torque observed when starting the engine. For example, a typical automotive alternator will have a rated peak torque of 12 Nm, an inertia of 0.00030 kg m$^2$, and an acceleration rate at the alternator of 100,000 rad/s$^2$ during engine starting. Using Equation 1 at engine start-up the device must be able to handle 30 Nm of torque, but will not see such a high torque during all other operating conditions.

$$T = I\omega^2 \qquad \text{Equation 1:}$$

where

T=torque

I=alternator inertia $\omega^2$=acceleration rate

To avoid use of an oversize spring and one-way clutch that can handle the starting torque the inventive device uses a wrap spring that is decoupled after the peak rated torque has been experienced.

Figure 1:
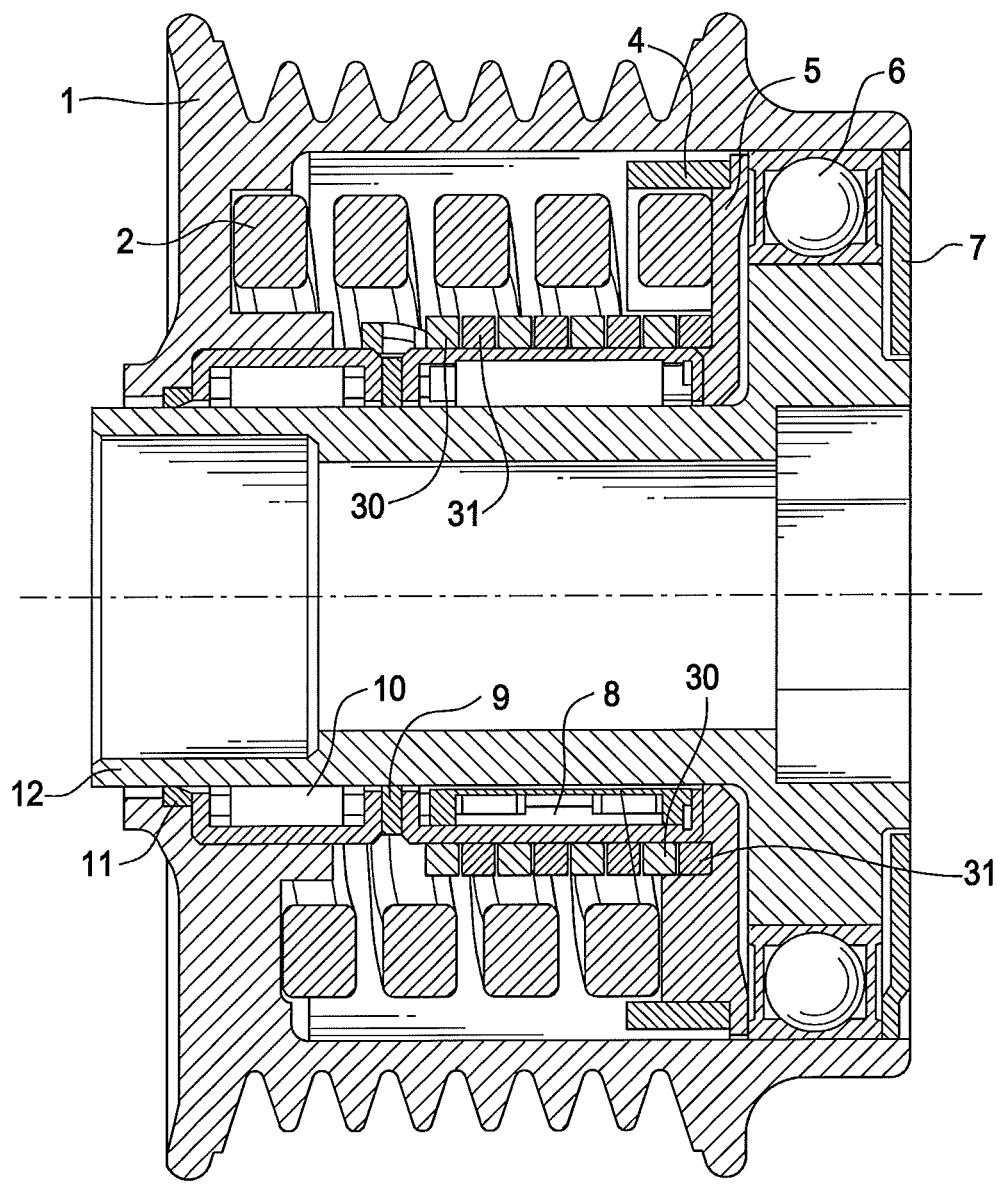
FIG. 1 is a section view of the isolating decoupler.

FIG. 1 is a section view of the isolating decoupler. Pulley 1 engages a belt (not shown) to drive a device such as an alternator. Pulley 1 houses a ball bearing 6 and a needle bearing 10 that allows relative motion between a shaft 12 and pulley 1 while transferring the radial load to shaft 12. Pulley 1 also contains a seal 11. Seal 11 is a rotary seal used to seal the lubricant in the device and to prevent contaminants from entering the device.

Power flows from pulley 1 to one end 21 of coil spring 2. Coil spring 2 is an elastic member that attenuates vibration and provides the isolating function of the device. The other end 22 of coil spring 2 is connected to spring carrier 5. Spring carrier 5 is made of plastic as shown, but could be made of any other suitable material as known in the art, for example, metal or phenolic. Pressed fit over spring carrier 5 is a reinforcing ring 4 that retains coil spring 2 in the radial direction. Connected to spring carrier 5 are two torsion springs 30, 31.

Torsion springs 30, 31 have the same diameter. The volutes for each torsion spring 30, 31 are parallel and thereby comprise adjacent parallel strands or wires. Torsion springs 30, 31 are also parallel in terms of their configuration between the spring carrier 5 and the one-way clutch 8, as compared to springs arranged in series. Each end of each torsion spring 30, 31 is portioned 180° out of phase from the other corresponding spring end in spring carrier 5 so that the load from torsion spring 30 is canceled out by the other torsion spring 31, see FIG. 4. End 3b of torsion spring 30 engages spring carrier receiving portion 51. End 3d of torsion spring 31 engages spring carrier receiving portion 52. Receiving portion 51 on the spring carrier for the first torsion spring 30 is 180 degrees out of phase with the receiving portion 52 on the spring carrier for the second torsion spring 31.

Torsion springs 30 and 31 frictionally engage one-way clutch 8 and thereby drive one-way clutch 8. In turn, one-way clutch 8 drives shaft 12. One-way clutch 8 allows shaft 12 to decouple or overrun when shaft 12 is spinning faster than pulley 1.

Two torsion springs 30, 31 are used to balance or counter act the radial load that is applied to the one-way clutch 8 that would otherwise be applied if only a single torsion spring was frictionally engaged with one-way clutch 8. It is well known in the art that one-way clutches should not be subject to significant radial loading in the absence of bearing supports to take the radial load, therefore the inventive device is designed to counter act the radial force that would otherwise be applied to one-way clutch 8 by a single torsion spring 30.

Torsion spring 30 comprises a tang 3a that interacts with stop 1a on pulley 1. Torsion spring 30 is frictionally engaged with one-way clutch 8 by wrapping around the outside surface of the one-way clutch 8. The two components move together until tang 3a contacts stop 1a. Contact with stop 1a causes torsion spring 30 to be unwound, thereby increasing the diameter of the volutes, which in turn reduces the frictional engagement with one-way clutch 8. This limits the amount of torque that can be transferred from torsion spring 30 to one-way clutch 8 though the frictional connection. Limiting the maximum torque that can be transmitted by torsion spring 30 prevents spring 2 and one-way clutch 8 from being overloaded.

Torsion spring 31 comprises a tang 3c that interacts with stop 1b on pulley 1. Torsion spring 30 is frictionally engaged with one-way clutch 8 by wrapping around the outside surface of the one-way clutch 8. The two components move together until tang 3c contacts stop 1b. Contact with stop 1b causes torsion spring 31 to be unwound, thereby increasing the diameter of the volutes, which in turn reduces the frictional engagement with one-way clutch 8. This limits the amount of torque that can be transferred from torsion spring 31 to one-way clutch 8 though the frictional connection. Limiting the maximum torque that can be transmitted by torsion spring 31 prevents coil spring 2 and one-way clutch 8 from being overloaded.

A thrust washer 9 holds one-way clutch 8 in its proper axial position when torsion springs 30 and 31 are released causing slipping between torsion springs 30 and 31 and one-way clutch 8. Thrust washer 9 is in contact with needle bearing 10 and urges one-way clutch 8 axially into position against spring carrier 5.

Figure 2:
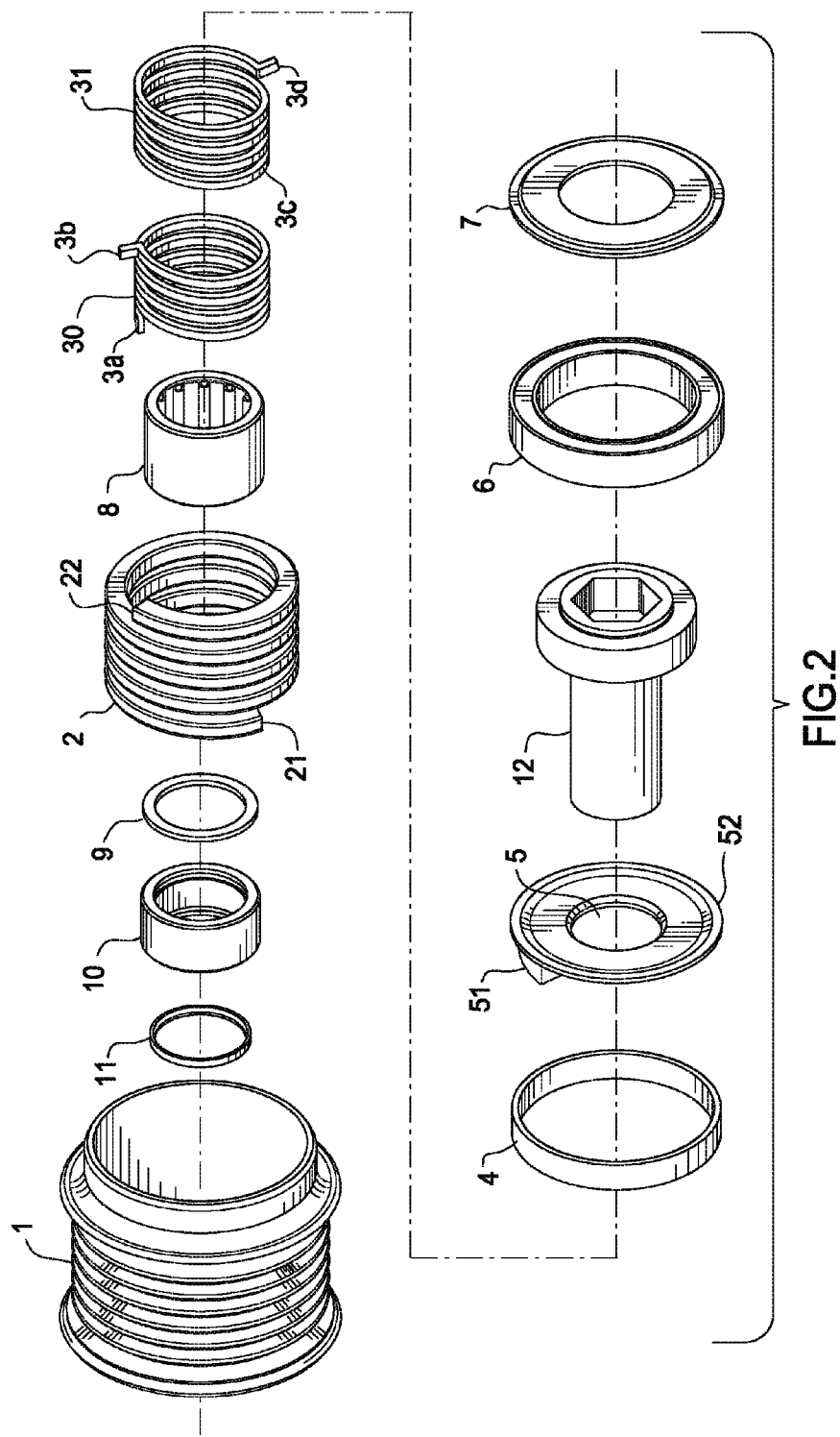
FIG. 2 is an exploded view of the isolating decoupler.

FIG. 2 is an exploded view of the isolating decoupler.

Figure 3:
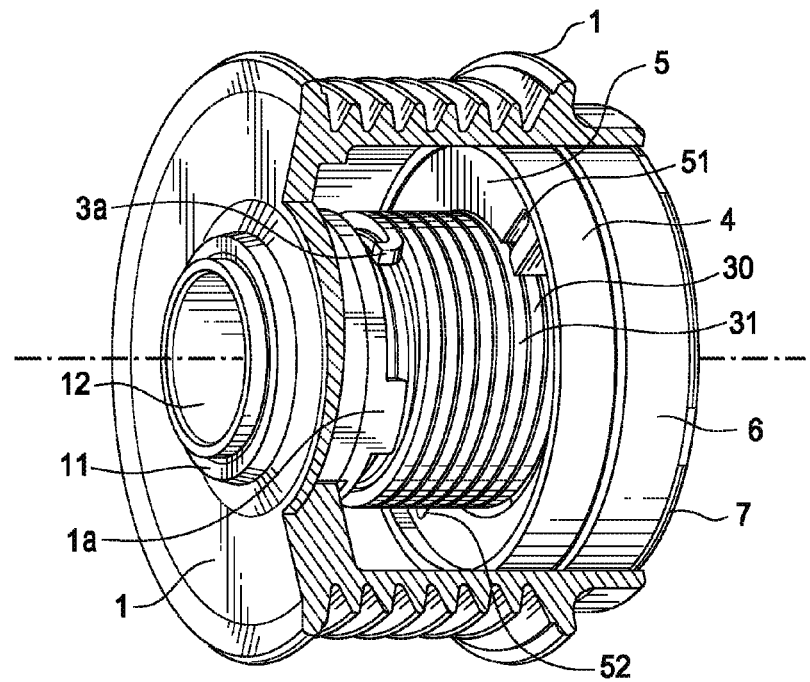
FIG. 3 is a cut away view showing how the torsion spring works in the device.

FIG. 3 is a cut away view showing how the torsion spring works in the device. Tang 3a engages stop 1a on pulley 1. As torque increases, spring carrier 5 will rotate relative to the shaft 12 as coil spring 2 deflects under the load being transmitted to pulley 1. Ultimately, tang 3a will contact stop 1a. When this occurs, any further increase in torque will cause torsion spring 30 and to each "unwind", thereby releasing the frictional engagement between each torsion spring 30 and 31 and the one-way clutch 8. The friction release will allow the shaft to turn relative to the pulley, thereby reducing the torque being transmitted to the pulley and belt.

Figure 4:
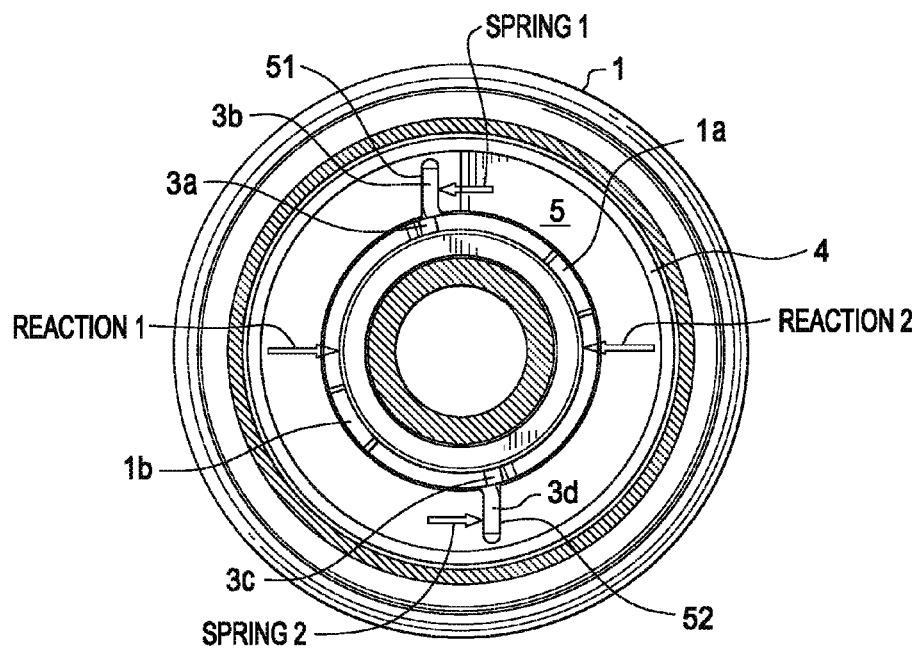
FIG. 4 is a diagram that explains the use of two wrap springs.

FIG. 4 is free body diagram that explains the use of two wrap springs. "Spring 1" is the vector representing the power being transmitted from the spring carrier 5 to torsion spring 30. "Spring 2" is the vector representing the power being transmitted from the spring carrier 5 to torsion spring 31. "Reaction 1" is the radial force exerted by torsion spring 30 on the one-way clutch 8. "Reaction 2" is the radial force exerted by torsion spring 31 on the one-way clutch 8. Reaction 1 cancels Reaction 2. Stop 1a on the pulley that is engagable with the torsion spring 30 is 180 degrees out of phase with the stop 1b on the pulley that is engagable with the torsion spring 31.

Figure 5:
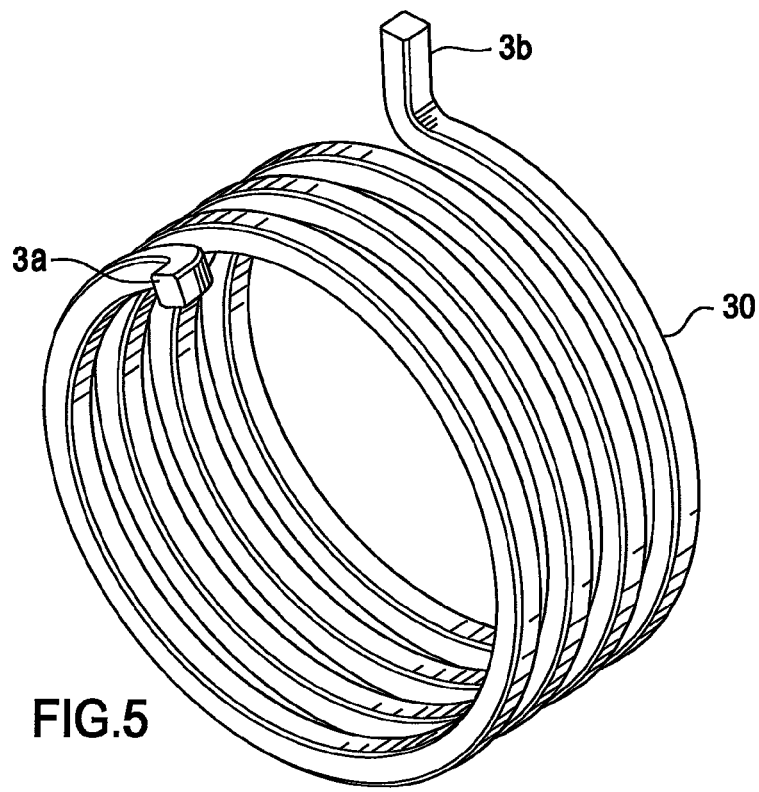
FIG. 5 is a perspective view of a torsion spring 30.

FIG. 5 is a perspective view of a torsion spring 30.

Figure 6:
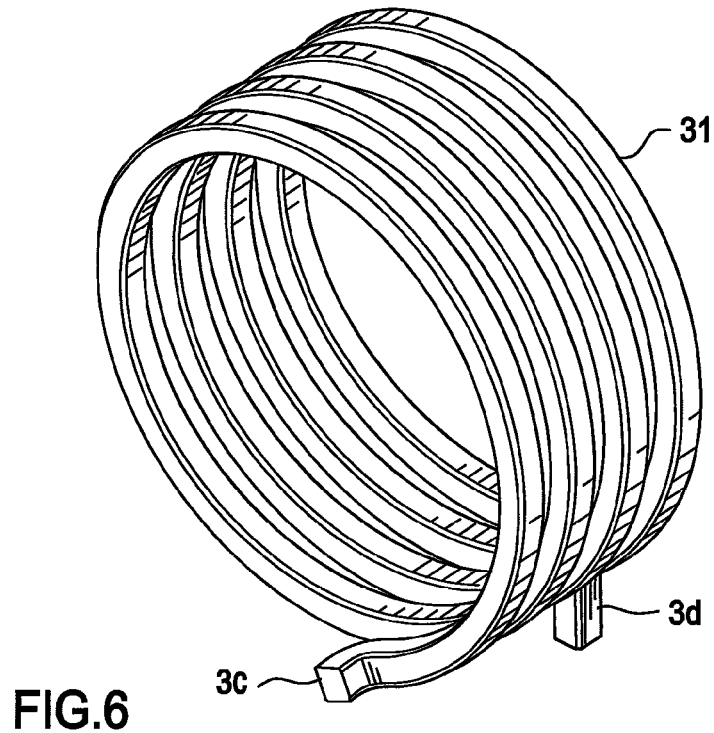
FIG. 6 is a perspective view of a torsion spring 31.

FIG. 6 is a perspective view of a torsion spring 31.

Figure 7:
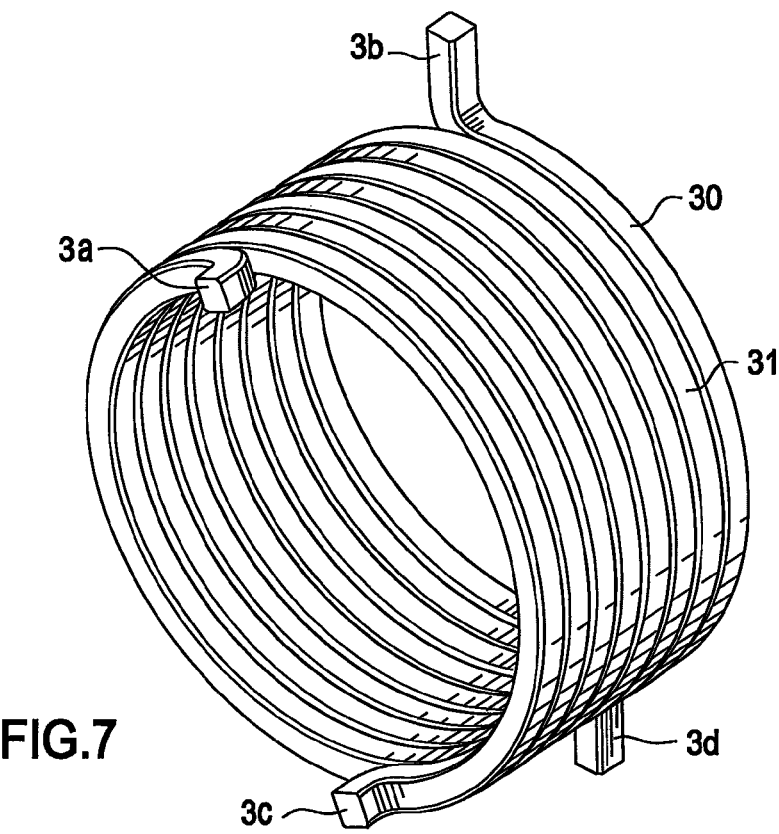
FIG. 7 is a perspective view of two torsion springs.

FIG. 7 is a perspective view of two torsion springs. Tang 3b is 180 degrees out of phase with tang 3d. Tang 3a is 180 degrees out of phase with tang 3c. The volutes for each spring are adjacent and parallel. Each volute from torsion spring 30 is interleaved with the adjacent volute from the other torsion spring 31.

Figure 8:
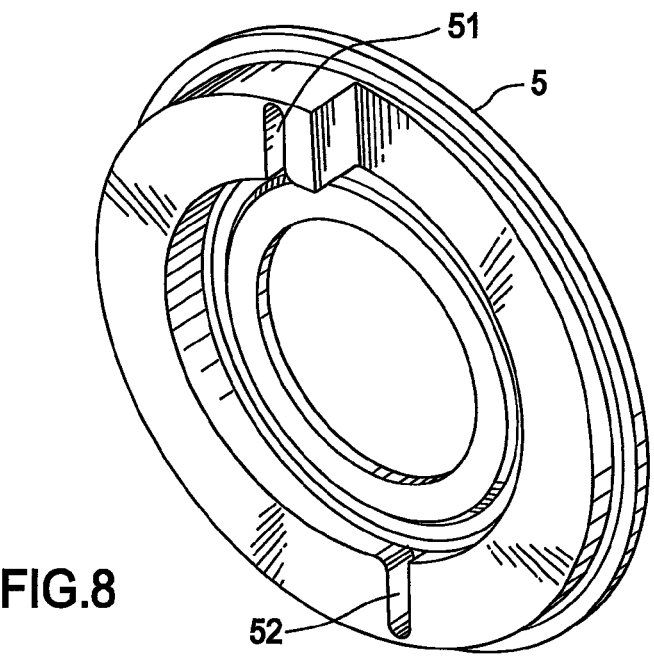
FIG. 8 is a perspective view of the spring carrier.

FIG. 8 is a perspective view of the spring carrier. Receiving portion 51 receives tang 3b. Receiving portion 52 receives tang 3d.

Figure 9:
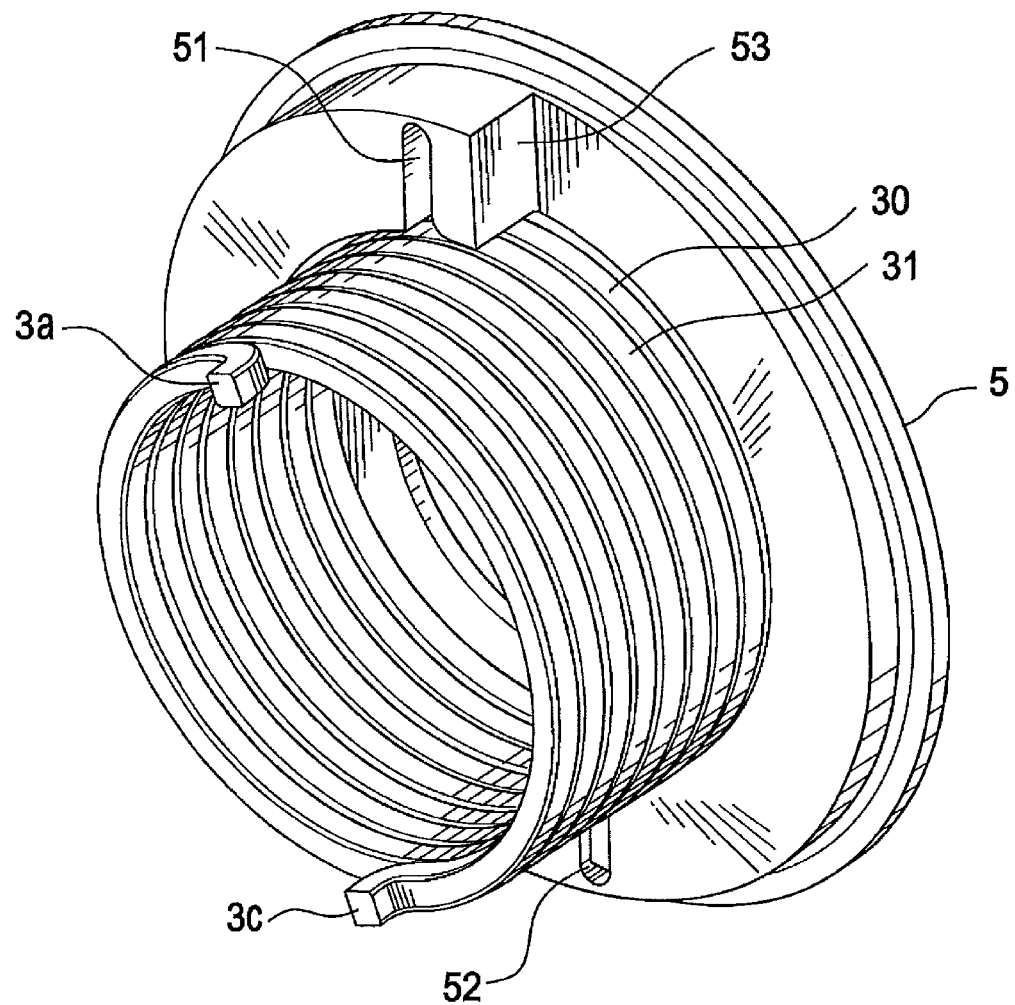
FIG. 9 is a perspective view of both torsion springs in the spring carrier.

FIG. 9 is a perspective view of the torsion springs in the spring carrier. An end of coil spring 2 bears upon surface 53.

Although a form of the invention has been described herein, it will be obvious to those skilled in the art that variations may be made in the construction and relation of parts without departing from the spirit and scope of the invention described herein.

We claim:

1. An isolating decoupler comprising:

a shaft;

a pulley rotationally engaged with the shaft;

a coil spring engaged between the pulley and a spring carrier, the spring carrier moveable relative to the shaft and pulley;

a one-way clutch mounted to the shaft;

a first torsion spring and a second torsion spring engaged between the spring carrier and the one-way clutch, the first torsion spring and the second torsion spring having a releasable frictional engagement with the one-way clutch;

the first torsion spring and the second torsion spring comprising adjacent parallel strands and having substantially equal diameters;

the first torsion spring and the second torsion spring each being engagable with the pulley;

the first torsion spring releasing a frictional engagement with the one-way clutch upon an engagement with the pulley; and the second torsion spring releasing a frictional engagement with the one-way clutch upon an engagement with the pulley.

2. The isolating decoupler as in claim 1, wherein the first torsion spring and the second torsion spring are parallel.

3. The isolating decoupler as in claim 1, wherein the spring carrier comprises a receiving portion receiving a torsion spring end.

4. The isolating decoupler as in claim 1 further comprising a reinforcing ring.

5. The isolating decoupler as in claim 1 wherein the pulley further comprises a first stop for engaging an end of the first torsion spring and a second stop for engaging an end of the second torsion spring.

6. An isolating decoupler comprising:

a shaft;

a pulley rotationally engaged with the shaft;

a coil spring engaged between the pulley and a spring carrier, the spring carrier moveable relative to the shaft and pulley;

a one-way clutch mounted to the shaft; and a first torsion spring and a second torsion spring connected to the spring carrier and each having a releasable frictional engagement with the one-way clutch, and each being releasably engagable with the pulley.

7. The isolating decoupler as in claim 6, wherein the first torsion spring and the second torsion spring comprise adjacent parallel strands, and the first torsion spring and the second torsion spring having substantially equal diameters.

8. The isolating decoupler as in claim 6 wherein the first torsion spring and the second torsion spring are in a parallel configuration.

9. The isolating decoupler as in claim 6, wherein a receiving portion on the spring carrier for the first torsion spring is 180 degrees out of phase with a receiving portion on the spring carrier for the second torsion spring.

10. The isolating decoupler as in claim 6, wherein a stop on the pulley that is engagable with the first torsion spring is 180 degrees out of phase with a stop on the pulley that is engagable with the second torsion spring.

11. An isolating decoupler comprising:

a shaft;

a pulley rotationally engaged with the shaft;

a coil spring engaged between the pulley and a spring carrier, the spring carrier moveable relative to the shaft and pulley;

a one-way clutch mounted to the shaft;

a first torsion spring and a second torsion spring engaged between the spring carrier and the one-way clutch, the first torsion spring and the second torsion spring having a releasable frictional engagement with the one-way clutch;

the first torsion spring and the second torsion spring comprising adjacent parallel strands and having substantially equal diameters;

the first torsion spring and the second torsion spring each being engagable with the pulley;

the first torsion spring releasing a frictional engagement with the one-way clutch upon an engagement with the pulley;

the second torsion spring releasing a frictional engagement with the one-way clutch upon an engagement with the pulley; and the pulley further comprises a first stop for engaging an end of the first torsion spring and a second stop for engaging an end of the second torsion spring.

12. An isolating decoupler comprising:

a shaft;

a pulley rotationally engaged with the shaft;

a coil spring engaged between the pulley and a spring carrier, the spring carrier moveable relative to the shaft and pulley;

a one-way clutch mounted to the shaft;

a first torsion spring and a second torsion spring engaged between the spring carrier and the one-way clutch, the first torsion spring and the second torsion spring having a releasable frictional engagement with the one-way clutch;

the first torsion spring and the second torsion spring comprising adjacent parallel strands and having substantially equal diameters;

the first torsion spring and the second torsion spring each being engagable with the pulley;

the first torsion spring releasing a frictional engagement with the one-way clutch upon an engagement with the pulley;

the second torsion spring releasing a frictional engagement with the one-way clutch upon an engagement with the pulley; and the pulley further comprises a first stop for engaging an end of the first torsion spring and a second stop for engaging an end of the second torsion spring, the first stop is 180 degrees out of phase with the second stop on the pulley.

\* \* \* \* \*